Aug. 14, 1934.  H. K. BOUVIER ET AL  1,970,038
SOUND REPRODUCING DEVICE
Filed June 15, 1929    3 Sheets-Sheet 1

Witness:
William P. Kilroy

Inventors
H. Karl Bouvier
Freeland Wells
By Dyrenforth, Lee, Chritton & Wiles
Attys Aug. 14, 1934.     H. K. BOUVIER ET AL     1,970,038
SOUND REPRODUCING DEVICE
Filed June 15, 1929     3 Sheets-Sheet 2
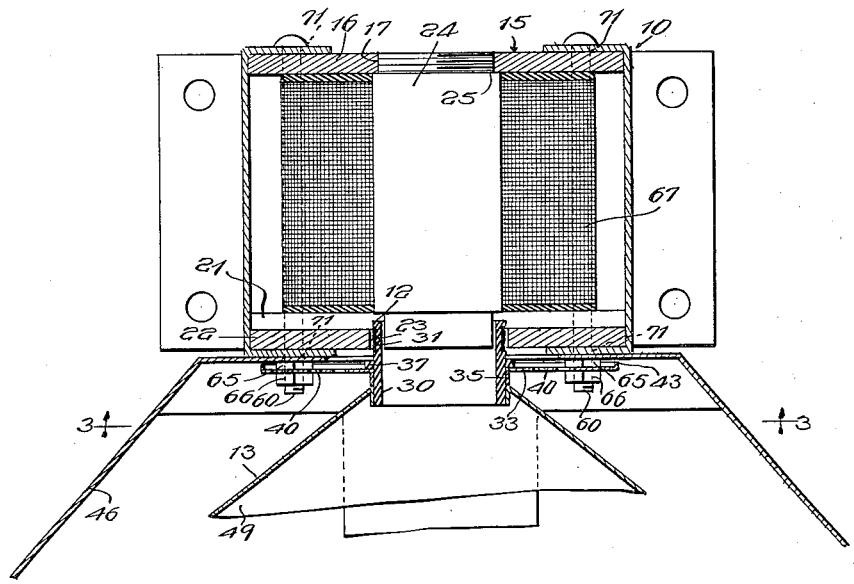
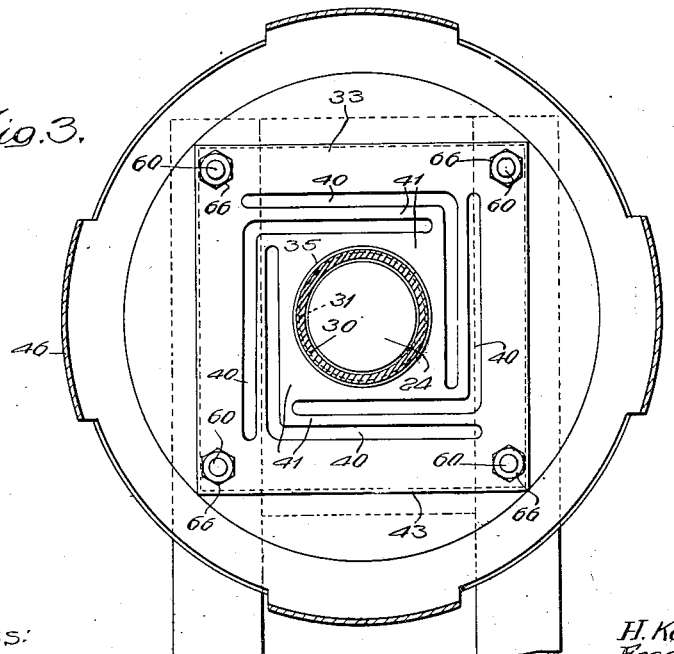

Aug. 14, 1934.  H. K. BOUVIER ET AL  1,970,038
SOUND REPRODUCING DEVICE
Filed June 15, 1929  3 Sheets-Sheet 3
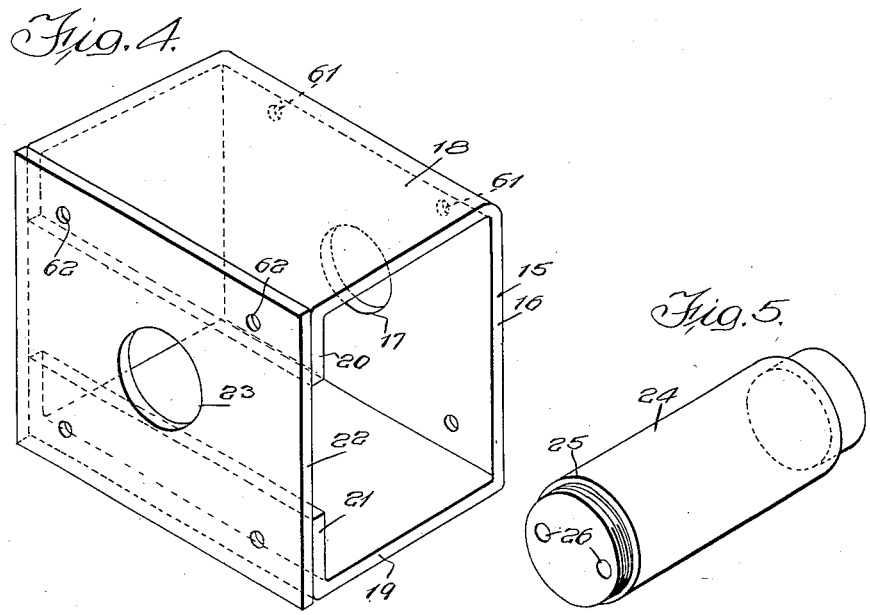
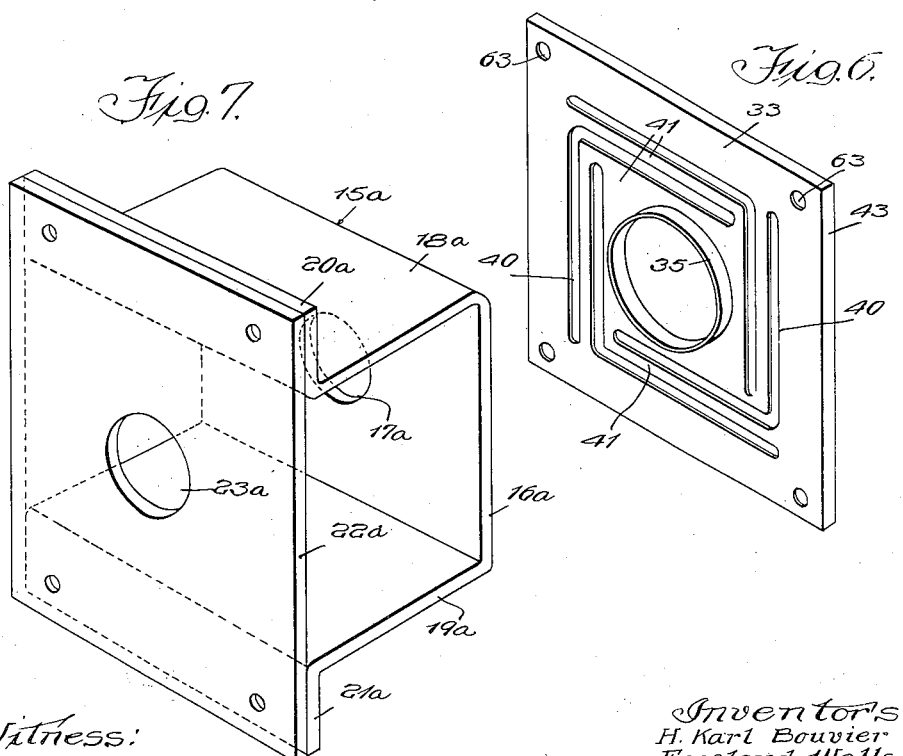
Witness:
William P. Kilroy
Inventors
H. Karl Bouvier
Freeland Wells Patented Aug. 14, 1934

1,970,038

UNITED STATES PATENT OFFICE 1,970,038

SOUND REPRODUCING DEVICE

Harold Karl Bouvier and Freeland Wells, La Grange, Ill., assignors to Temple Corporation, Chicago, Ill., a corporation of Delaware Application June 15, 1929, Serial No. 371,236

7 Claims. (Cl. 179—115.5)

Our invention relates to sound reproducing devices, and particularly to devices of the kind described adapted to be employed in connection with radio-receiving sets, or the equivalent.

The invention has among its other objects the production of sound reproducing devices of the kind described, and which are exceedingly efficient in operation and reproduce sound without distortion thereof.

A particular object of the invention is to provide improved magnetizing structures for sound reproducing devices of the kind described.

Another particular object of the invention is to provide improved sound reproducing devices that comprise parts which may be assembled quickly and easily.

Still another particular object of the invention is to provide sound reproducing devices of simplified construction.

Many other objects and advantages will become apparent as this description progresses, reference being had to the accompanying drawings, wherein:

Fig. 2 is a section taken on line 2—2 of Fig. 1.

Fig. 3 is a section taken on line 3—3 of Fig. 2.

Fig. 4 is a perspective view of a magnet member and a pole piece which form parts of the improved sound reproducing device shown in Fig. 1.

Fig. 5 is a perspective view of a pole piece adapted to be assembled with the magnet member and pole piece shown in Fig. 4.

Fig. 6 is a perspective view of a member forming part of the improved sound reproducing device shown in Fig. 1, and adapted to yieldingly support means for actuating a diaphragm, and Fig. 7 is a perspective view of apparatus embodying another form of the invention.

Figure 1:
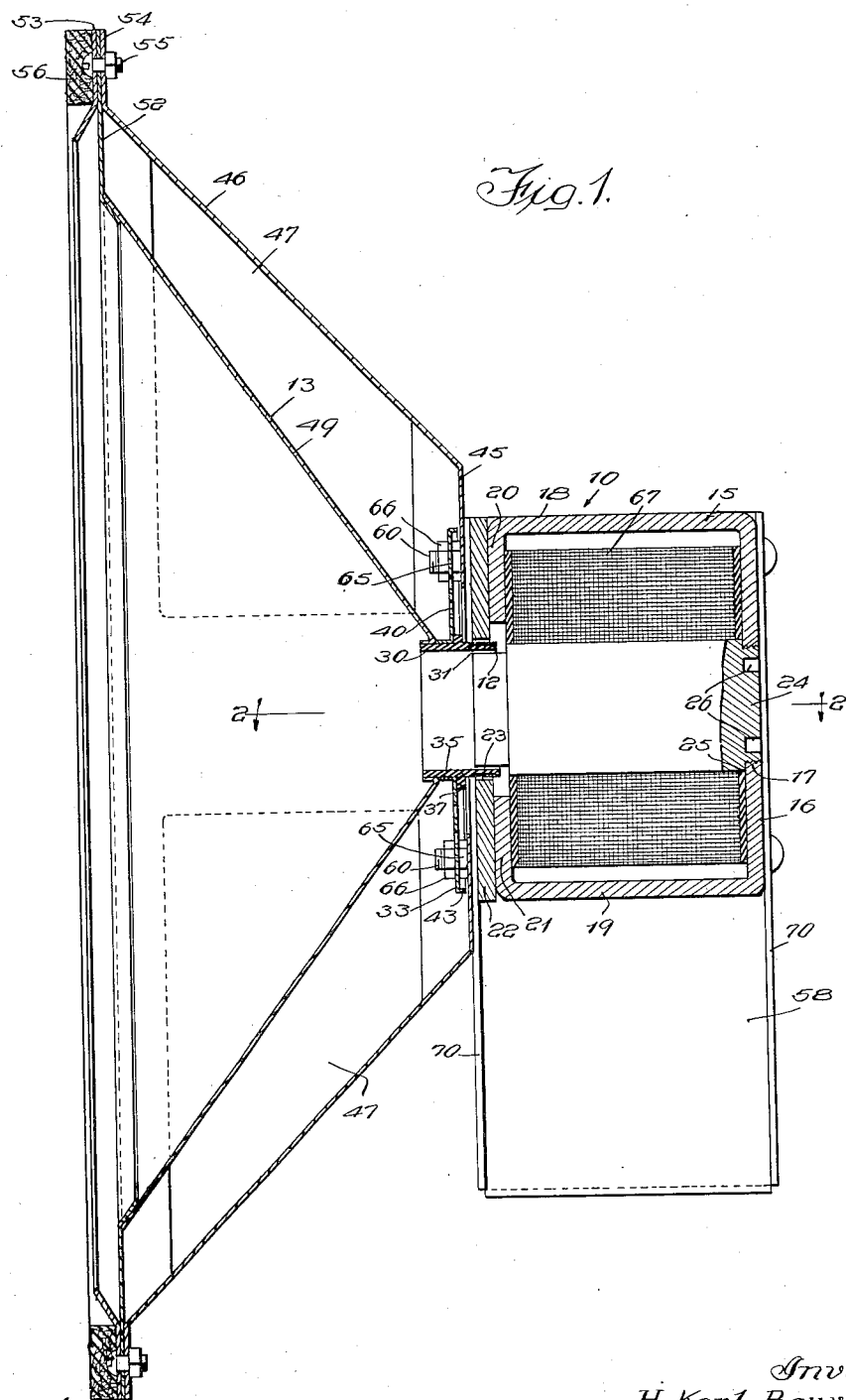
Figure 1 is a central vertical section taken through a sound reproducing device which embodies the invention.

Referring for the present to Figs. 1 to 6, inclusive, wherein we have illustrated a sound reproducing device which embodies our invention, the reference character 10 designates generally a magnetizing structure which cooperates with an electrical conductor, armature or winding 12 to actuate a diaphragm 13.

As best illustrated in Figs. 1 and 4, the magnetizing structure 10 preferably comprising a substantially U-shaped magnet member 15 having a rear wall 16 provided with a screw-threaded aperture 17. Formed integral with the rear wall 16 are legs 18 and 19 which project forwardly and have their outer ends turned inwardly, as illustrated at 20 and 21. Contacting with the outer surfaces of the magnet member ends 20 and 21 is a plate or pole piece 22 provided with a relatively large aperture 23 which is preferably coaxially disposed with respect to the aperture 17.

Screw-threaded into the aperture 17 is one end of a pole piece 24 (see Figs. 1 and 5). This end of the pole piece 24 is preferably of reduced diameter to provide an annular shoulder 25 which abuts the inner surface of the rear wall 16, the pole piece 24 being preferably provided with holes 26 engageable by a suitable tool (not shown) whereby the pole piece may be turned to draw the shoulder 25 tight against the inner surface of the rear wall 16. The other end of the pole piece 24 is also of reduced diameter and projects into the aperture 23 to provide an annular magnetic field between it and the plate or pole piece 22.

The winding 12 is concentrically disposed in the annular field provided between the pole pieces 24 and 22, the winding being preferably supported by a sleeve 30 provided with an annular groove 31 in which the winding is disposed. The means for supporting the sleeve 30 preferably comprises a member 33 which is preferably formed from relatively thin and flexible sheet metal, and is preferably provided with an integral collar 35 which is attached to the sleeve 30 by adhesive, or any other suitable means. The sleeve 30 is provided with an outwardly extending flange 37 intermediate its ends, which flange forms a stop against which the member 33 abuts. As best shown in Fig. 6, the member 33 is preferably slotted, as at 40, to provide a plurality of flexible arms 41 which carry the collar 35, and therefore carry the sleeve 30 with its winding 12. As shown, the member 33 is preferably rectangular in form and is preferably provided with an integral flange 43 extending entirely around the periphery thereof. In this instance, the flange 43 spaces the slotted portion of the member 33 from an apertured disc 45 formed integral with a frusto-conical member 46 which supports the marginal portion of the diaphragm 13, but the primary function of the flange 43 is to prevent vibration of the edges of the member 33, which vibration would produce hum or interference with the sound waves produced by the diaphragm.

The diaphragm 13 preferably comprises a conical portion 49 formed from paper and apertured at its apex to accommodate the forward end of the sleeve 30, the frusto-conical portion 49 being rigidly secured to the sleeve by adhesive, or any other suitable means. An annulus 52 preferably formed from relatively flexible leather, or the equivalent, has its inner periphery rigidly secured to the larger end of the conical portion 49 and has its outer edge clamped between the ring 53 and an annular member 54, the annular member 54 being formed integral with the frusto-conical portion 46. The ring 53 and the annular member 54 are secured to each other by bolts 55, or the equivalent. A ring 56 formed of felt, or the equivalent, is preferably secured to the front surface of the ring 53 so that the loud speaker or sound reproducing device may be positioned against a baffle, or the equivalent.

The member 33, the disc 45, a pair of frame members 58 and the pole piece 22 are rigidly secured to the magnet member 15 by four bolts 60 which project through apertures 61 provided in the rear wall 16 and in the magnet member ends 20 and 21. The bolts 60 also project through apertures 62 provided in the pole piece 22 and apertures provided in the member 33. As best shown in Fig. 2, the heads of the bolts 60 are preferably positioned at the rear of the reproducing device and the threaded ends project forwardly to receive nuts 65 and 66, the nuts 66 being arranged to abut the outer surface of the member 33 and the nuts 65 being disposed between the member 33 and the disc 45 to function as spacers so that the nuts 60 cannot be tightened to distort the member 33.

Carried by the pole piece 24 is a winding 67 which may be connected to any source of electrical energy so that the magnetic field between the pole pieces 22 and 24 will be relatively intense. The winding 12 is connected by suitable electrical conductors (not shown) to the output circuit of a radio-receiving set, or the equivalent, and obviously the fluctuating currents that flow in the winding 12 will react with the magnetic field to cause vibration of the winding, which vibration is transmitted to the diaphragm 13 through the sleeve 30, it being understood that the member 33 is formed of relatively resilient material to provide a restoring force when the winding 12 is displaced in either direction from the position wherein it is shown in Fig. 1.

The frame members 58 are preferably provided with side flanges 70 having apertures 71 through which the bolts 60 pass. This construction is exceedingly advantageous as it facilitates the task of assembling the several parts of the improved sound reproducer. Thus, the winding 67 may be positioned within the magnet member 15 and the pole piece 24 may be inserted in the magnet member in the manner explained above. Then the pole piece 22 may be placed in position together with the disc 45 and the parts carried thereby, after which the nuts 65 and the member 33 may be positioned upon the bolts 60, the bolts 60 having previously been inserted through the magnet member 15. After the several parts have been assembled, as described above, the nuts 66 may be threaded in place, care being taken to have the pole piece 22 rigidly secured to the magnet member 15 in such manner that the aperture 23 is disposed concentrically with respect to the pole piece 24. For this purpose, the apertures 62 in the pole piece 22 are somewhat larger in diameter than the bolts 60.

Referring now to Fig. 7 wherein we have illustrated another form of the invention, the reference character 15a identifies a magnet member which may be employed in place of the above described magnet member 15, the magnet member 15a comprising a rear wall 16a having a screw-threaded aperture 17a and formed integral with the rear wall 16a are legs 18a and 19a which have their ends bent outwardly, as illustrated at 20a and 21a. Secured to the magnet member ends 20a and 21a by bolts (not shown) is a pole piece 22a provided with an aperture 23a. The aperture 23a is preferably of the same diameter as the aperture 23 provided in the pole piece 22 and the pole piece 24 may be screw-threaded into the aperture 17a and have its forward end project into the aperture 23a to provide an annular magnetic field. Obviously, the magnet member 16a and the pole piece 22a may be employed in place of the magnet member 15 and the pole piece 22 without making material changes in the remainder of the parts of the sound reproducer shown in Fig. 1.

In some instances in the appended claims, we have employed the term "magnet member" to include the magnet member 15 and the pole piece 22, which could be formed from one piece, if it were so desired.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible, in view of the prior art.

What we claim new is:

1. A device of the kind described comprising a U-shaped magnet member having integral inwardly turned ends, a plate of magnetic material secured to said ends and provided with an aperture, a pole piece screw-threaded into said magnet member and projecting into said aperture to form an annular magnetic field therein, a diaphragm, and means reacting with said magnetic field for actuating said diaphragm.

2. A device of the kind described comprising a U-shaped magnet member having inwardly turned ends, a pole piece having an aperture therein, said pole piece being secured to said ends, a second pole piece secured to said magnet member and projecting into said aperture to provide an annular magnetic field therein, frame members for supporting said magnet member, a winding in said magnetic field, a sleeve for carrying said winding, flexible means for supporting said sleeve, a diaphragm operatively connected to said sleeve, and common means for securing the first-mentioned pole piece, said frame members and said flexible means to said magnetic member.

3. A device of the kind described comprising a magnetizing structure having an annular magnetic field, a winding in said field, a sleeve carrying said winding, a diaphragm operatively connected to said sleeve, and means for movably supporting said sleeve, said supporting means comprising a flexible sheet metal plate having a flange extending therearound and having an integral collar attached to said sleeve.

4. A device of the kind described including a magnetizing structure which comprises a U-shaped magnet member having inwardly extending integral ends, a plate mounted on said inwardly extending ends and apertured to provide an annular pole piece, a second pole piece of substantially round cross-section screw-threaded into said magnet member and co-operating with said annular pole piece to form an annular magnetic field, said second pole piece being provided with an annular shoulder engaging said magnet member to hold said second pole piece concentric with respect to said annular pole piece, frame members supporting said magnetizing structure, a voice coil in said magnetic field, a sleeve for said voice coil, a flexible member supporting said sleeve, common means for securing said frame members and said flexible member to said magnetizing structure, and a diaphragm secured to said sleeve.

5. A device of the kind described including a magnetizing structure which comprises a U-shaped magnet member having outwardly extending integral ends, a plate mounted on said outwardly extending ends and apertured to provide an annular pole piece, a second pole piece of substantially round cross-section screw-threaded into said magnet member and co-operating with said annular pole piece to form an annular magnetic field, said second pole piece being provided with an annular shoulder engaging said magnet member to hold said second pole piece concentric with respect to said annular pole piece, frame members supporting said magnetizing structure, a voice coil in said magnetic field, a sleeve for said voice coil, a flexible member supporting said sleeve, common means for securing said frame members and said flexible member to said magnetizing structure, and a diaphragm secured to said sleeve.

6. A device of the kind described comprising a U-shaped magnet member, a pole piece having an aperture therein, said pole piece being secured to said magnet member, a second pole piece secured to said magnet member and projecting into said apertures to provide an annular magnetic field therein, frame members for supporting said magnet member, common means for securing said frame member and the first-mentioned pole piece to said magnet member, a diaphragm, and means reacting with said field for actuating said diaphragm.

7. A device of the kind described comprising a U-shaped member having outwardly turned ends, a pole piece having an aperture therein, said pole piece being secured to said ends, a second pole piece secured to said magnet member and projecting into said aperture to provide an annular magnetic field therein, a diaphragm, means for supporting said diaphragm, means reacting with said field actuating said diaphragm, and a plurality of bolts for securing said diaphragm, said supporting means and the first-mentioned pole piece to said magnet member, each of said bolts passing through said diaphragm supporting means and the first-mentioned pole piece.

H. KARL BOUVIER.
FREELAND WELLS.